Dec. 21, 1965  A. T. BIEHL  3,225,227
MINIATURE MAGNETOHYDRODYNAMIC GENERATOR
Filed July 2, 1962
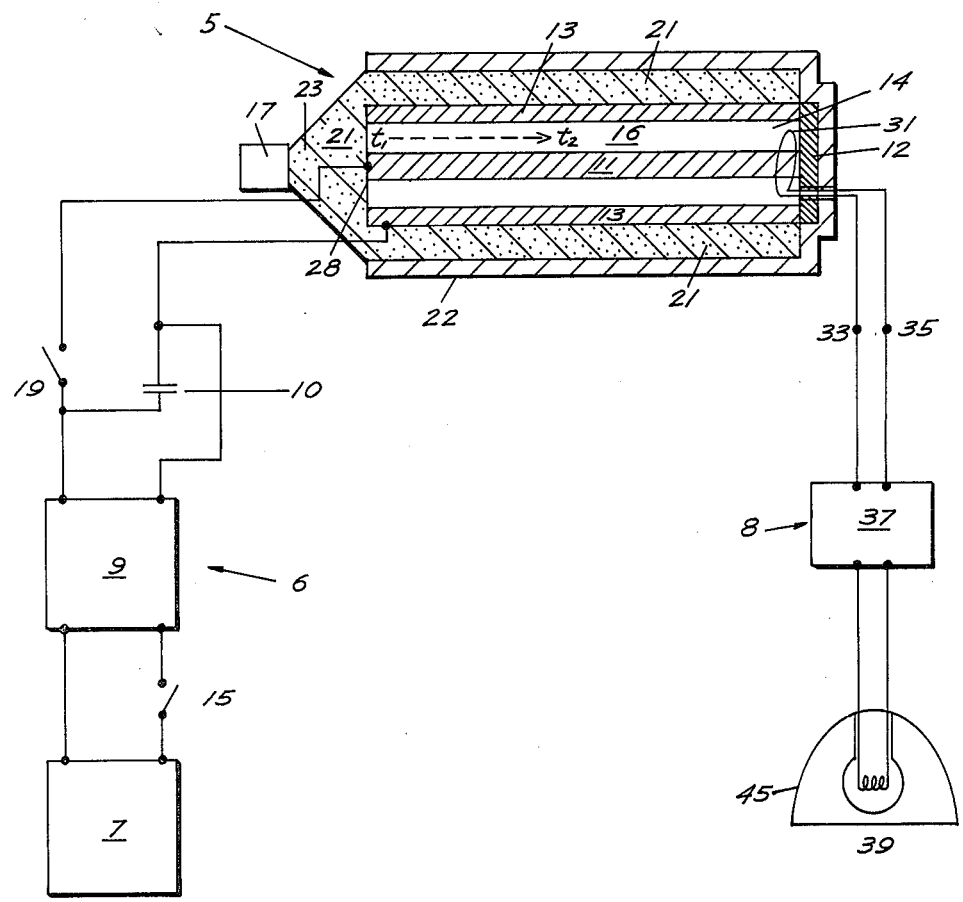
INVENTOR.
Arthur T. Biehl
BY
Edwin J. Greigg

United States Patent Office 3,225,227
Patented Dec. 21, 1965

3,225,227
MINIATURE MAGNETOHYDRODYNAMIC
GENERATOR
Arthur T. Biehl, Diablo, Calif., assignor to MB
Associates, a corporation of California
Filed July 2, 1962, Ser. No. 206,763
3 Claims. (Cl. 310—11)

This invention relates to a miniature magnetohydrodynamic generator and more particularly a miniature magnetohydrodynamic generator wherein an energy amplifier system is provided of miniature dimensions which utilizes both electrical and chemical energy to achieve amplified energy levels for short durations.

In accordance with the present invention about 200 joules of electrical energy will be available to the generator output as a result of the amplification of about $\frac{1}{10}$ of a joule of charging energy through the explosive compression of a magnetic field. An average power of about 50 megawatts will be available for a duration of five microseconds thus providing a short high energy power pulse suitable for many applications. The miniature dimensions of this completely contained power generating unit creates uses which heretofore could not practically exist. The relatively large and heavy equipment required to achieve the power output levels of this invention are prohibitive for applications requiring mobility and miniature size. Typically, when it has been desired to achieve the energy levels of this invention, it has been necessary to use condenser banks which are much larger and heavier than the present invention.

The size range which appropriately describes this invention corresponds to the size range of a conventional rifle to shotgun rounds; the generator including its charging and output networks may be housed in a flare gun. For the present purposes the generator in the indicated size range will be termed a "miniature" generator to distinguish from previous devices. This completely self-contained power generating unit of the indicated miniature size may be easily used in situations which require a minaturized, portable high energy power source. Although other configurations are contemplated, the use of a gun's structure particularly the hammer-trigger-handle combination lends itself conveniently to many proposed uses. Applications such as a high intensity flash illuminator or communicator seem particularly attractive. In this application the high energy pulse of the output of the generator may be used to operate a flash tube directly or through a pulse shaping network. This will provide a very high intensity short duration flash which could be used to illuminate objects of interest at great distances. This short duration directional signal could also be used in covert communication as well as observation situations as in both instances the duration of the light pulse would be so short as to make it undetectable by the human eye. It would also be possible to use this high energy power supply to operate an X-ray unit for medical analysis. A completely new generator unit is required for each pulse; however, the simplicity and size of this unit makes its replacement intrinsically easy and inexpensive.

One object of this invention is to provide a miniature magnetohydrodynamic generator that is much smaller than generators considered practical heretofore.

Another object of the present invention is to provide a miniature magnetohydrodynamic generator which can be utilized in a completely self-contained light weight unit for hand operation.

Another object of this invention is to provide a magnetohydrodynamic generator which may be easily and inexpensively used and replaced to provide a relatively high energy pulse of short duration.

Still another object of this invention is to provide a magnetohydrodynamic generator which may be utilized in combination with a high intensity flash illuminator or other electrical devices.

Other objects and advantages of this invention will be set forth in the following description of the invention and illustrated in the accompanying drawing wherein similar reference characters relate to similar components and of which drawing:

The drawing is a sectional view of a miniature magnetohydrodynamic generator embodying the present invention with associated charging and output networks.

Referring now to the drawing by reference characters, there is shown a magnethydrodynamic generator generally designated 5, a charging network generally designated 6, load network generally designated 8. The charging net work may comprise a battery 7 with D.C. to D.C. high voltage converter 9 to charge the capacitor 10 and switch 19. The magnetohydrodynamic generator comprises electrical conductors 11, 12 and 13, a detonator 17, explosive material 21. The conductor 11 is generally a cylindrical body of conductive materials such as copper or aluminum while the conductor 13 is disposed in substantially coaxial orientation to 11 and with the conductor 12 joining said conductors 11 and 13 at the end generally designated 14; all conductors may be of similar material. The charging of the electrical conductors 11, 12 and 13 by the capacitor 10 results in a magnetic field in the space 16. The battery 7 may be a 1½ ounce nickel cadmium or mercury cell which would suffice for approximately 3,000 charging operations. The D.C. transistorized converter 9 may typically be comprised of two transistors, a transducer, and two diodes. Charging the capacitor 10 may be accomplished in approximately ten seconds. A neon glow bulb may be used to indicate when the capacitor 10 is charged to a level of approximately 0.1 joule. The detonator 17 is actuated by a suitable mechanism (impact, spark and electrostatically sensitive detonators may be used) which also closes the switch 19. The detonator 17 initiates a detonation wave in the explosive material 21 which is tamped by suitable material 22 and is timed with the closing of the switch 19 to collapse the outer conductor 13 at the detonator end of the generator to contact the inner conductor 11 at 28 when the capacitor discharge has reached its maximum level whereby the resulting magnetic field in the annulus 16 is trapped. As the explosive material 21 burns toward the output end of the generator, it progressively collapses the conductor compressing it axially from left to right.

A coil 31 at the far end of the coaxial conductors intersect the magnetic field as it is compressed converting magnetic energy to electrical energy which is now available from the output leads 33 and 35. The electrical energy developed as the electrical conductor 13 contacts 11 progressively toward the end 14 as indicated by the dashed line $t_1$–$t_2$ may be delivered to a pulse shaping network 37 from output 33 and 35. This network may drive high voltage flash tube 39 or other electrical devices. The explosive material 21 may be such compounds as composition "B" or composition "C." The output loop 31 may be placed so as to intersect the compressing magnetic field 28 in a skewed orientation. The voltage output across 33, 35 will be directly proportional to the area of the loop 31 perpendicular to the magnetic field or skewedness of said loop 31. Control of the voltage output therefore may be easily accomplished by adjusting the pick up loop's skewedness. The flash tube 39 may be a commercially available type such as FT–218 with 200 watts second energy input and 10,000 lumen seconds output. Both larger and smaller tubes are possible depending on the voltage characteristics of the output. A parabolic reflector 45 may be incorporated to control the directional operation of the light pulse. The output of the generator 5 at 33 and 35 may be placed across the flash tube directly resulting in a decrease in tube life, but increase in system simplicity; this life still being greater than 1,000 flashes.

What is claimed is:

1. A magnetohydrodynamic generator comprising a first inner electrically conductive material, a second outer electrically conductive material coaxially aligned with said first material and defining an annular space therebetween, a source of electrical energy connected to said first and second materials for generating a magnetic field in said space, conductive means interconnecting said materials at one of their ends, an explosive charge surrounding said second material and having detonating means adjacent the other ends of said materials for initiating an axially progressing wave in said charge to progressively collapse said second material toward said conductive means, and means for extracting the generated electrical energy from the compression of said magnetic field.

2. A magnetohydrodynamic generator as defined in claim 1, wherein said means for extracting generated energy comprises at least one loop conductor disposed so as to intersect the compressed magnetic field generated by the collapse of said second conductive material.

3. The magnetohydrodynamic generator as defined in claim 1 wherein said source of electrical energy comprises a switch for external operation.

References Cited by the Examiner

Journal of Applied Physics, "Production of Very High Magnetic Fields by Implosion," vol. 31, No. 3, March 1960, pp. 588–594.

GEORGE N. WESTBY, *Primary Examiner.*

DAVID J. GALVIN, *Examiner.*